US012783660B2

(12) United States Patent
Na et al.

(10) Patent No.: US 12,783,660 B2
(45) Date of Patent: Nov. 3, 2026

(54) ADVERSARIAL ATTACK METHOD AND APPARATUS

(71) Applicant: Research & Business Foundation SUNGKYUNKWAN UNIVERSITY, Suwon-si (KR)

(72) Inventors: CheolWon Na, Suwon-si (KR); YunSeok Choi, Goyang-si (KR); Jee-Hyong Lee, Suwon-si (KR)

(73) Assignee: Research & Business Foundation SUNGKYUNKWAN UNIVERSITY, Suwon-si (KR)

( * ) Notice: Subject to any disclaimer, the term of this patent is extended or adjusted under 35 U.S.C. 154(b) by 163 days.

(21) Appl. No.: 18/779,597

(22) Filed: Jul. 22, 2024

(65) Prior Publication Data

US 2025/0028824 A1 Jan. 23, 2025

(30) Foreign Application Priority Data

Jul. 21, 2023 (KR) ........................ 10-2023-0095277

(51) Int. Cl.
*G06F 21/56* (2013.01)

(52) U.S. Cl.
CPC ...... *G06F 21/563* (2013.01); *G06F 2221/033* (2013.01)

(58) Field of Classification Search
CPC .. G06F 21/563; G06F 2221/033; G06F 21/55; G06F 21/14; G06F 21/577; G06N 3/094
See application file for complete search history.

(56) References Cited

U.S. PATENT DOCUMENTS

2018/0225460 A1* 8/2018 Nakajima ............. G06F 21/577
2022/0029972 A1* 1/2022 Gharibi .................... G06F 18/24
2022/0083670 A1* 3/2022 Suzuki .................. G06F 21/577
2022/0244953 A1* 8/2022 Ji .............................. G06F 8/41
(Continued)

FOREIGN PATENT DOCUMENTS

CN 114036521 A 2/2022
KR 10-2020-0095219 A 8/2020
(Continued)

OTHER PUBLICATIONS

Tian et al., "Generating Adversarial Examples of Source Code Classification Models via Q-Learning-Based Markov Decision Process", Dec 2021, IEEE 21st International Conference on Software Quality, Reliability and Security, pp. 807-818 (Year: 2021).*
(Continued)

*Primary Examiner* — Kenneth W Chang

(57) ABSTRACT

The present disclosure relates to an adversarial attack method and apparatus. The adversarial attack method according to an embodiment of the present disclosure may include: selecting vulnerable positions of an original source code; acquiring open source codes based on an open source code set; selecting dissimilar codes among the open source codes based on dissimilarity of the open source codes; acquiring an attention score for each of the dissimilar codes; extracting a snippet from at least one of the dissimilar codes based on the attention scores; and generating an adversarial source code based on the at least one snippet.

13 Claims, 5 Drawing Sheets

(56) References Cited

U.S. PATENT DOCUMENTS

2022/0276628 A1* 9/2022 Canedo ................ G05B 19/056
2022/0292200 A1* 9/2022 Zou ....................... G06F 18/214

FOREIGN PATENT DOCUMENTS

KR 10-2023-0032319 A 3/2023
KR 10-2023-0099500 A 7/2023

OTHER PUBLICATIONS

Wong et al., "Deceiving Deep Neural Networks-Based Binary Code Matching with Adversarial Programs", Oct. 2022, IEEE International Conference on Software Maintenance and Evolution, pp. 117-128 (Year: 2022).*

Notice of Allowance for Korean Patent Application No. 10-2023-0095277, dated Jul. 31, 2025.

* cited by examiner

FIG. 4

| Task (Language) | Victim Model | Attack Method | Attack efficiency | | Attack quality | |
|---|---|---|---|---|---|---|
| | | | ASR | Query | Pert | CodeBLEU |
| Clone Detection (Java) | CodeBERT | MHM | 20.2 | 667.7 | 0.32 | 0.56 |
| | | ALERT | 28.6 | 529.4 | 0.13 | 0.73 |
| | | DIP(ours) | 46.7 | 19.9 | 0.13 | 0.92 |
| | Graph CodeBERT | MHM | 4.2 | 1025.9 | 0.36 | 0.32 |
| | | ALERT | 9.2 | 448.6 | 0.13 | 0.72 |
| | | DIP(ours) | 36.6 | 78.2 | 0.14 | 0.85 |
| | CodeT5 | MHM | 4.6 | 104.5 | 0.26 | 0.42 |
| | | ALERT | 22.0 | 762.2 | 0.14 | 0.73 |
| | | DIP(ours) | 31.8 | 38.2 | 0.11 | 0.93 |
| Defect Detection (C/C++) | CodeBERT | MHM | 37.4 | 451.9 | 0.33 | 0.32 |
| | | ALERT | 31.4 | 277.6 | 0.11 | 0.76 |
| | | DIP(ours) | 44.6 | 47.6 | 0.19 | 0.91 |
| | Graph CodeBERT | MHM | 41.3 | 316.7 | 0.33 | 0.31 |
| | | ALERT | 46.7 | 263.6 | 0.10 | 0.76 |
| | | DIP(ours) | 49.7 | 71.0 | 0.13 | 0.79 |
| | CodeT5 | MHM | 49.3 | 333.5 | 0.10 | 0.78 |
| | | ALERT | 46.9 | 187.4 | 0.08 | 0.80 |
| | | DIP(ours) | 49.7 | 61.0 | 0.16 | 0.92 |
| Authorship Attribution (Python) | CodeBERT | MHM | 15.9 | 444.0 | 0.13 | 0.78 |
| | | ALERT | 29.6 | 545.4 | 0.13 | 0.79 |
| | | DIP(ours) | 31.1 | 300.15 | 0.09 | 0.85 |
| | Graph CodeBERT | MHM | 26.5 | 774.9 | 0.30 | 0.49 |
| | | ALERT | 50.8 | 573.2 | 0.15 | 0.75 |
| | | DIP(ours) | 61.4 | 292.6 | 0.08 | 0.81 |
| | CodeT5 | MHM | 36.4 | 684.6 | 0.16 | 0.78 |
| | | ALERT | 41.7 | 373.4 | 0.10 | 0.83 |
| | | DIP(ours) | 43.9 | 47.2 | 0.07 | 0.92 |
| All | Average | MHM | 25.1 | 537.7 | 0.25 | 0.53 |
| | | ALERT | 34.1 | 440.1 | 0.12 | 0.76 |
| | | DIP(ours) | 43.9 | 106.2 | 0.12 | 0.88 |

ADVERSARIAL ATTACK METHOD AND APPARATUS

CROSS REFERENCE TO RELATED APPLICATION

This application claims priority from Republic of Korea Patent Application No. 10-2023-0095277, filed on Jul. 21, 2023, which is hereby incorporated by reference in its entirety.

BACKGROUND

Field

The present disclosure relates to an adversarial attack method and apparatus, and particularly to, an adversarial attack method and apparatus for verifying vulnerabilities and improving the robustness of artificial intelligence models that process programming languages.

Related Art

Recently, artificial intelligence technology that helps software developers by automatically processing and analyzing source code has been developed in various fields. These artificial intelligence models are vulnerable to adversarial attacks. Most of the conventional adversarial attack methods against these source code processing artificial intelligence models are sampling-based variable name changes, which may be inefficient due to the large number of attempts and low attack success rate. In particular, the conventional methods have the issue of not completely preserving compilability, which is an important element of source code.

SUMMARY

An aspect of the present disclosure is directed to providing a black box adversarial attack method and apparatus that shows a high attack success rate with few attempts when a model is attacked using an adversarial attack technique in a black box situation.

An adversarial attack method according to an embodiment of the present disclosure may include: selecting vulnerable positions of an original source code; acquiring open source codes based on an open source code set; selecting dissimilar codes among the open source codes based on dissimilarity of the open source codes; acquiring an attention score for each of the dissimilar codes; extracting a snippet from at least one of the dissimilar codes based on the attention scores; and generating an adversarial source code based on the at least one snippet.

The selection of the dissimilar codes among the open source codes based on dissimilarity of the open source codes may include: acquiring similarity between the open source codes; acquiring a dissimilarity score of each of the open source codes based on the similarity; and selecting some of the open sources as the dissimilar codes based on the dissimilarity score.

The acquisition of the similarity between the open source codes may include acquiring cosine similarity between the open source codes.

The extraction of the snippet from at least one of the dissimilar codes based on the attention scores may include: extracting sentences from each of the dissimilar codes; and extracting the sentence extracted from the dissimilar code with the highest attention score among the extracted sentences as the snippet.

The generation of the adversarial source code based on the at least one snippet may include: generating a dead code by inserting the at least one snippet into a character string variable name; and generating the adversarial source code by inserting the dead code into the vulnerable positions of the original source code.

An adversarial source code generation apparatus according to an embodiment of the present disclosure may include a processor and a memory storing one or more instructions executed by the processor, wherein the one or more instructions may include: selecting vulnerable positions of an original source code; acquiring open source codes based on an open source code set; selecting dissimilar codes among the open source codes based on dissimilarity of the open source codes; acquiring an attention score for each of the dissimilar codes; extracting a snippet from at least one of the dissimilar codes based on the attention scores; and generating an adversarial source code based on the at least one snippet.

The selection of the dissimilar codes among the open source codes based on dissimilarity of the open source codes may include: acquiring similarity between the open source codes; acquiring a dissimilarity score of each of the open source codes based on the similarity; and selecting some of the open sources as the dissimilar codes based on the dissimilarity score.

The acquisition of the similarity between the open source codes may include acquiring cosine similarity between the open source codes.

The extraction of the snippet from at least one of the dissimilar codes based on the attention scores may include: extracting sentences from each of the dissimilar codes; and extracting the sentence extracted from the dissimilar code with the highest attention score among the extracted sentences as the snippet.

The generation of the adversarial source code based on the at least one snippet may include: generating a dead code by inserting the at least one snippet into a character string variable name; and generating the adversarial source code by inserting the dead code into the vulnerable positions of the original source code.

An adversarial attack performance analysis method according to an embodiment of the present disclosure may include: receiving an original source code from an original source code provision apparatus; receiving an adversarial source code from an adversarial source code generation apparatus; and determining whether an artificial intelligence model has been attacked by the adversarial source code based on the original source code and the adversarial source code, wherein the adversarial source code may be generated by: selecting vulnerable positions of an original source code; acquiring open source codes based on an open source code set; selecting dissimilar codes among the open source codes based on dissimilarity of the open source codes; acquiring an attention score for each of the dissimilar codes; extracting a snippet from at least one of the dissimilar codes based on the attention scores; and generating the adversarial source code based on the at least one snippet.

The selection of the dissimilar codes among the open source codes based on dissimilarity of the open source codes may include: acquiring similarity between the open source codes; acquiring a dissimilarity score of each of the open source codes source codes based on the similarity; and selecting some of the open sources as the dissimilar codes based on the dissimilarity score.

The acquisition of the similarity between the open source codes may include acquiring cosine similarity between the open source codes.

The extraction of the snippet from at least one of the dissimilar codes based on the attention scores may include: extracting sentences from each of the dissimilar codes; and extracting the sentence extracted from the dissimilar code with the highest attention score among the extracted sentences as the snippet.

The generation of the adversarial source code based on the at least one snippet may include: generating a dead code by inserting the at least one snippet into a character string variable name; and generating the adversarial source code by inserting the dead code into the vulnerable positions of the original source code.

According to an embodiment of the present disclosure, vulnerabilities in an artificial intelligence model served in the real world can be efficiently identified through adversarial attacks in a black box situation where no information from the model is used.

According to an embodiment of the present disclosure, the robustness of the artificial intelligence model can be improved by adding the results of the adversarial attack to a learning data set and performing additional adversarial learning.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 4 is a conceptual diagram illustrating the effect of an adversarial attack method according to an embodiment of the present disclosure.

DESCRIPTION OF EXEMPLARY EMBODIMENTS

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated. In general, suffixes such as "module" and "unit" may be used to refer to elements or components. Use of such suffixes herein is merely intended to facilitate description of the specification, and the suffixes do not have any special meaning or function. In the present disclosure, that which is well known to one of ordinary skill in the relevant art has generally been omitted for the sake of brevity. The accompanying drawings are used to assist in easy understanding of various technical features and it should be understood that the embodiments presented herein are not limited by the accompanying drawings. As such, the present disclosure should be construed to extend to any alterations, equivalents, and substitutes in addition to those which are particularly set out in the accompanying drawings.

It will be understood that although the terms first, second, etc. may be used herein to describe various elements, these elements should not be limited by these terms. These terms are only used to distinguish one element from another.

It will be understood that when an element is referred to as being "electrically connected with" or "connected with" another element, there may be intervening elements present. In contrast, it will be understood that when an element is referred to as being "directly and electrically connected with" or "connected with" another element, there are no intervening elements present. A singular representation may include a plural representation unless context clearly indicates otherwise.

In the following description, it should be understood that the term such as "include" or "have" is designed to designate the presence of a property, a figure, a step, an operation, an element, a component, or the combination thereof, and does not preclude a possibility of the presence of one or more other features or addition to the property, the figure, the step, the operation, the element, the component, or the combination thereof.

Figure 1:
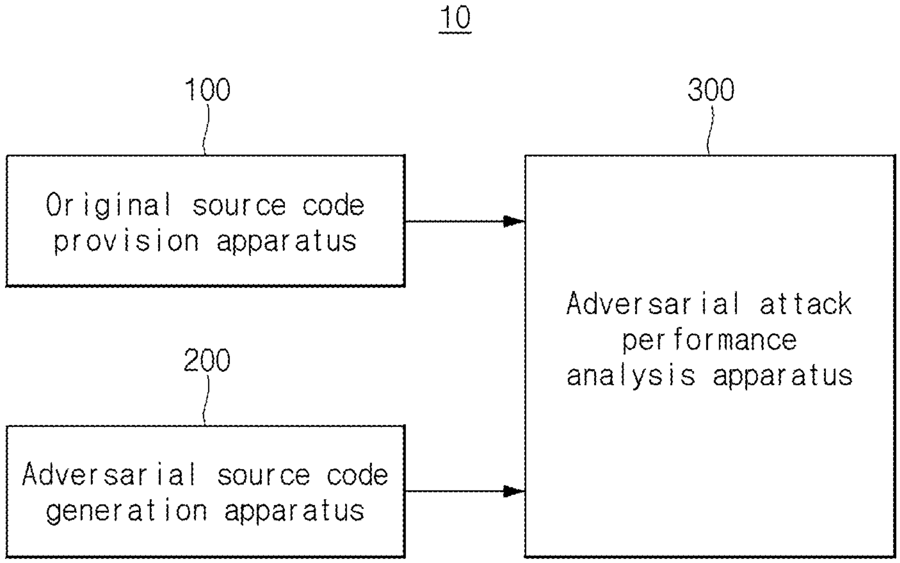
FIG. 1 is a conceptual diagram of an adversarial attack analysis system according to an embodiment of the present disclosure.

FIG. 1 is a conceptual diagram of an adversarial attack analysis system according to an embodiment of the present disclosure.

Referring to FIG. 1, a black box adversarial attack system 10 according to an embodiment of the present disclosure may include an original source code provision apparatus 100, an adversarial source code generation apparatus 200, and an adversarial attack performance analysis apparatus 300. For example, the adversarial attack performance analysis apparatus 300 may include, but is not limited to, an artificial intelligence model.

The original source code provision apparatus 100 may include an original source code. The original source code provision apparatus 100 may provide the original source code to the adversarial attack performance analysis apparatus 300.

The adversarial source code generation apparatus 200 may include the original source code. The adversarial source code generation apparatus 200 may generate an adversarial source code based on the original source code. The adversarial source code generation apparatus 200 may generate the adversarial source code based on the algorithm shown in Table 1 below.

TABLE 1

| Algorithm 1: DIP Pseudo-code |
| --- |
| Input : Source code $c_i$, true label y, target model M |
| Output : Adversarial Example $c_i^{adv}$ |
| Compute position importance $V_p \forall p \in c_i$ |
| Generate k candidate dead code |
| dead code list $\mathbb{D} = [d_1, \ldots, d_k]$ ordered by the dissimilarity |
| for p in ascending order of $V_p$ do |

TABLE 1-continued

Algorithm 1: DIP Pseudo-code

```
|   c_i^adv ← c_i
|   for d ∈ 𝔻 do
|   |   c_i^adv ← insert d into c_i at p
|   |   if M (c_i^adv) ≠ y then
|   |   |   # Success Attack
|   |   |   Return: c^adv
|   |   end
|   end
end
# Fail Attack
Return: c^adv ← None
```

Referring to Table 1, the adversarial source code generation apparatus 200 may define a position to attack as between lines of a source code to find which position is vulnerable, extract one line from among the lines included in the source code that is most dissimilar to the original source code as a snippet, generate a dead code by putting the extracted snippet into an unused character string variable, and generate the adversarial source code by inserting the dead code into a vulnerable position. The adversarial source code generation apparatus 200 may provide the adversarial source code to the adversarial attack performance analysis apparatus 300.

The adversarial attack performance analysis apparatus 300 may receive the original source code from the original source code provision apparatus 100. The adversarial attack performance analysis apparatus 300 may receive the adversarial source code from the adversarial source code generation apparatus 200.

The adversarial attack performance analysis apparatus 300 may perform learning based on the original source code and the adversarial source code. The adversarial attack performance analysis apparatus 300 may input the original source code and the adversarial source code into the artificial intelligence model. The adversarial attack performance analysis apparatus 300 may compare an output value of the artificial intelligence model based on the original source code and an output value of the artificial intelligence model based on the adversarial source code. The adversarial attack performance analysis apparatus 300 may determine whether the artificial intelligence model has been attacked by the adversarial source code through comparison of output values and determine the robustness of the artificial intelligence model.

Figure 2:
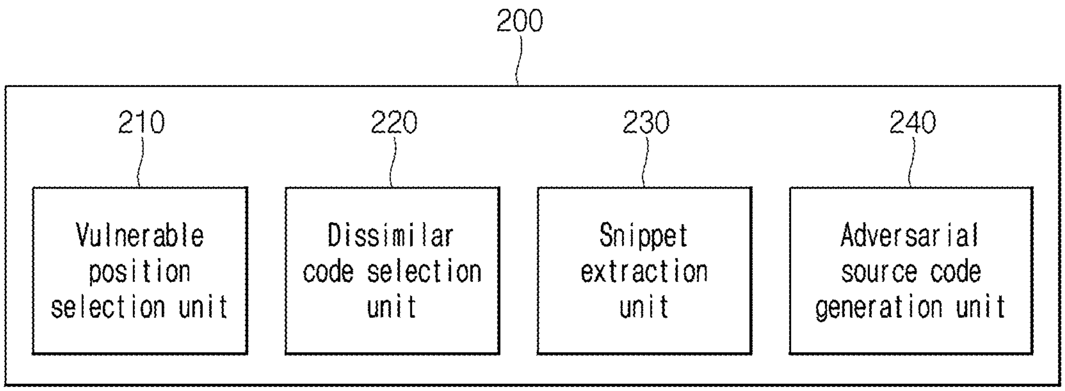
FIG. 2 is a block diagram of an adversarial source code generation apparatus according to an embodiment of the present disclosure.
Figure 3:
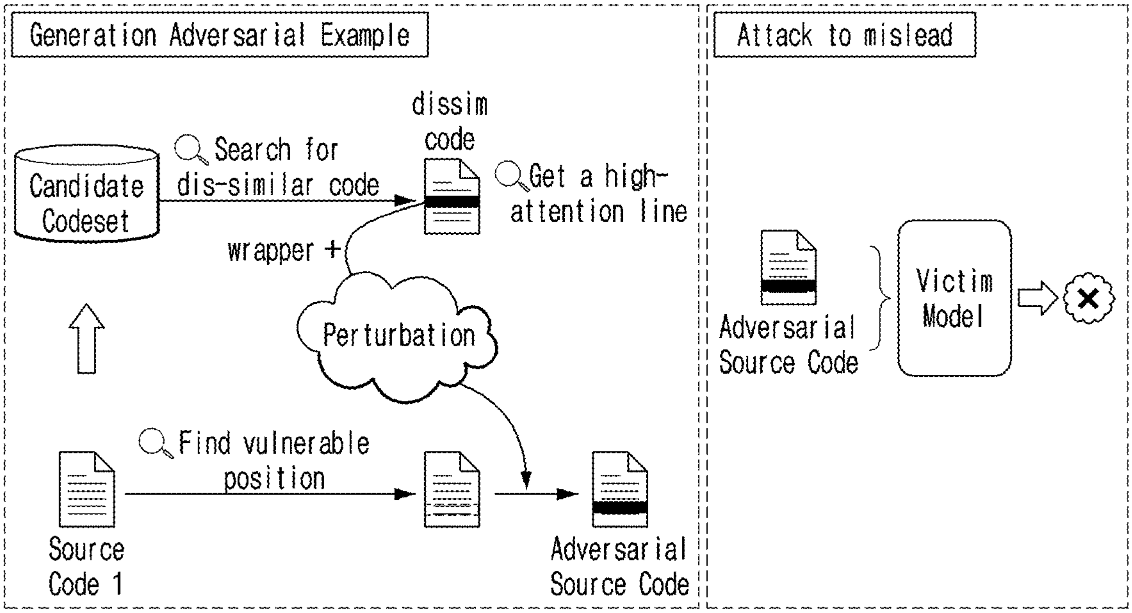
FIG. 3 is a conceptual diagram illustrating an adversarial source code generation apparatus according to an embodiment of the present disclosure.

FIG. 2 is a block diagram of an adversarial source code generation apparatus according to an embodiment of the present disclosure. FIG. 3 is a conceptual diagram illustrating an adversarial source code generation apparatus according to an embodiment of the present disclosure.

Referring to FIGS. 2 and 3, the adversarial source code generation apparatus 200 may include a vulnerable position selection unit 210, a dissimilar code selection unit 220, a snippet extraction unit 230, and an adversarial source code generation unit 240.

The vulnerable position selection unit 210 may select vulnerable positions from the original source code. Herein, the vulnerable positions may be positions where a dead code may be inserted and may be positions that are targets of attack.

For example, the vulnerable position selection unit 210 may acquire a [CLS] expression vector for each vulnerable position of the original source code. In this connection the [CLS] expression vector may be acquired from a pre-trained program language (PL) model that has not been fine-tuned. The non-fine-tuned and pre-trained PL model may include, but is not limited to, a CodeBERT model.

The vulnerable position selection unit 210 may insert a sequence of [UNK] tokens into the vulnerable positions to acquire a changed [CLS] expression vector at each of the vulnerable positions. The [UNK] token may be a token representing unknown. The sequence of [UNK] tokens may be expressed as Equation 1 below.

$$u = [UNK, UNK, \ldots, UNK] \qquad \text{[Equation 1]}$$

In Equation 1, u may be a sequence of [UNK] tokens.

The vulnerable position selection unit 210 may acquire cosine similarity between the changed [CLS] expression vector and the [CLS] expression vector of the original source code at each of the vulnerable positions. The vulnerable position selection unit 210 may acquire a vulnerability score at each of the vulnerable positions based on the cosine similarity at each of the vulnerable positions. The vulnerable position selection unit 210 may sort the vulnerable positions based on the vulnerability score at each of the vulnerable positions. The vulnerable position selection unit 210 may transmit information about the vulnerable positions to the adversarial source code generation unit 240.

The dissimilar code selection unit 220 may acquire open source codes from an open source code set. Herein, the open source codes may be the source code that is dissimilar to the original source code. The dissimilar code selection unit 220 may acquire a [CLS] expression vector for each of the open source codes. The dissimilar code selection unit 220 may acquire the cosine similarity between the [CLS] expression vectors of open source codes. The dissimilar code selection unit 220 may acquire a dissimilarity score for each of the open source codes based on the cosine similarity. The dissimilar code selection unit 220 may extract K open source codes with a high dissimilarity score among the open source codes. The dissimilar code selection unit 220 may transmit the K open source codes to the snippet extraction unit 230.

The snippet extraction unit 230 may receive the K open source codes from the dissimilar code selection unit 220. The snippet extraction unit 230 may acquire an attention score for each of the K open source codes. The snippet extraction unit 230 may acquire the attention score of each token in a statement from a second-to-last layer of the non-fine-tuned and pre-trained PL model. The snippet extraction unit 230 may acquire the attention score of each token from the pre-trained PL model without fine-tuning the attention score of each token. The non-fine-tuned and pre-trained PL model may include, but is not limited to, the CodeBERT model.

The snippet extraction unit 230 may extract sentences from each of the K open source codes. The snippet extraction unit 230 may select the sentence extracted from the open source code with the highest attention score among the extracted sentences as the snippet. The snippet extraction unit 230 may transmit the snippet to the adversarial source code generation unit 240.

The adversarial source code generation unit 240 may receive information about the vulnerable positions from the vulnerable position selection unit 210. The adversarial source code generation unit 240 may receive the snippet from the snippet extraction unit 230. The adversarial source code generation unit 240 may generate the dead code based on the snippet. The adversarial source code generation unit 240 may generate the dead code by inserting the snippet into an unused character string variable name. The adversarial source code generation unit 240 may generate an adversarial dead code based on the algorithm shown in Table 2 below.

TABLE 2

Algorithm 2: Dead Code Generation

```
Input  : Source code c_i, true label y,
         attention layer of CodeBERT T
Output : dead code list𝔻
ℂ ← {c_n|c_n∉ train/test data, n ≠ i}
Sample c_1, . . . , c_k fromℂ
ℂ ← {c_1, . . . , c_k}
# sortℂ using ScoreD in Section3.2
for c ∈ℂ do
 |  # tokenize and get attention score of c
 |  𝕊 ← {att_T(tok_l^c, . . . , att_T(tok_n^c)}
 |  # get line index(start,end of line) list ℙ
 |  ℙ ← [(1, a), (a + 1, b), . . . , (n + 1, m)]
 |  α ← 0
 |  for (s, e) ∈ℙ do
 |   |  if α < max{ 𝕊 [s : e]} then
 |   |   |  α ← max{ 𝕊 [s : e]}
 |   |   |  best_idx ← (s : e)
 |   |  end
 |   |  snippet_c ← c[best_idx]
 |  end
 |  d ← string var = "snippet_c";
 |  # append d to𝔻
end
𝔻 ← {d_1, . . . , d_k}
Return:𝔻
```

The adversarial source code generation unit 240 may generate the adversarial source code based on the information about vulnerable positions and dead code. The adversarial source code generation unit 240 may generate the adversarial source code by inserting the dead code into the vulnerable positions.

FIG. 4 is a conceptual diagram illustrating the effect of an adversarial attack method according to an embodiment of the present disclosure.

FIG. 4 is a diagram illustrating the effects of attack methods according to programming language (Task or Language) and victim model.

The programming language may be Java, C/C++, or Python. In the case of the victim model, MHM and ALERT may be conventional victim models, and DIP may be a victim model according to an embodiment of the present disclosure, and may correspond to the adversarial source code generation apparatus 200 of FIG. 1. The attack method may include attack efficiency and attack quality, wherein the attack efficiency may include attack success rate (ASR) and the number of successfully attacked queries, and the attack quality may include ratio of perturbation (Pert) and CodeBLEU. The ratio of perturbation may indicate how many perturbations are injected into the original source code, and the CodeBLEU may be a metric that measures the consistency of the generated code. When the CodeBLEU is close to 1, the code may maintain the semantic meaning of the original code.

Referring to FIG. 4, it may be checked that the victim model according to an embodiment of the present disclosure has better attack efficiency indices and mostly better attack quality indices than the conventional victim model.

Figure 5:
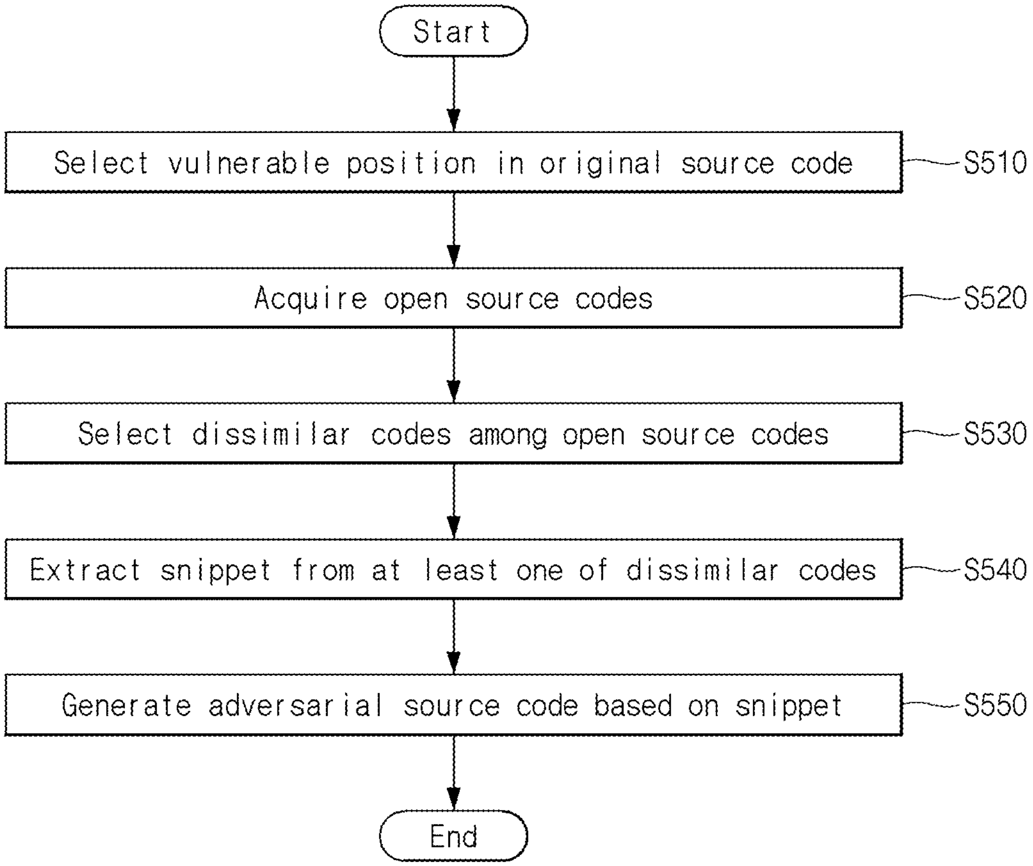
FIG. 5 is a flowchart of an adversarial attack method according to an embodiment of the present disclosure.

FIG. 5 is a flowchart of an adversarial attack method according to an embodiment of the present disclosure.

Referring to FIG. 5, the adversarial source code generation apparatus may select a vulnerable position in the original source code (S510).

The adversarial source code generation apparatus may acquire open source codes (S520). The adversarial source code generation apparatus may acquire open source codes from an open source code set. Herein, the open source codes may be source codes that are dissimilar to the original source code.

The adversarial source code generation apparatus may select dissimilar codes among the open source codes (S530). The adversarial source code generation apparatus may acquire similarity between the open source codes. The adversarial source code generation apparatus may acquire dissimilarity scores of the open source codes based on similarity. The adversarial source code generation apparatus may select K open source codes with high dissimilarity scores among the open source codes as dissimilar codes.

The adversarial source code generation apparatus may extract a snippet from at least one of the dissimilar codes (S540). The adversarial source code generation apparatus may acquire an attention score for each of the dissimilar codes and extract the snippet from the at least one of the dissimilar codes based on the attention scores.

The adversarial source code generation apparatus may extract sentences from each of the dissimilar codes, and extract the sentences extracted from the dissimilar code with the highest attention score among the extracted sentences as the snippet.

The adversarial source code generation apparatus may generate an adversarial source code based on the snippet (S550). The adversarial source code may generate a dead code by inserting at least one snippet into a character string variable name, and generate an adversarial source code by inserting the dead code into vulnerable positions in the original source code.

Figure 6:
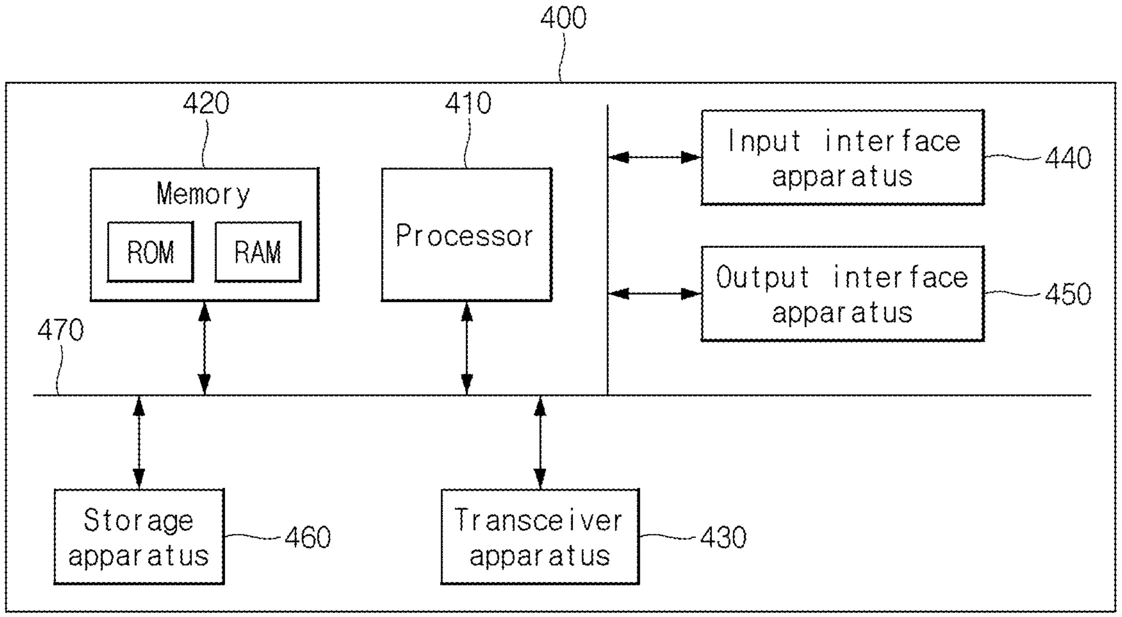
FIG. 6 is a block diagram of an adversarial source code generation apparatus according to another embodiment of the present disclosure.

FIG. 6 is a block diagram of an adversarial source code generation apparatus according to another embodiment of the present disclosure.

The adversarial source code generation apparatus 400 of FIG. 6 may be the same as the adversarial source code generation apparatus 200 of FIG. 1. The adversarial source code generation apparatus 400 may include at least one processor 410, a memory 420, and a transceiver apparatus 430 that is connected to a network and performs communication. Additionally, the adversarial source code generation apparatus 400 may further include an input interface apparatus 440, an output interface apparatus 450, and a storage apparatus 460. Each component included in the adversarial source code generation apparatus 400 may be connected by a bus 370 and may communicate with each other. However, each component included in the adversarial source code generation apparatus 400 may be connected through an individual interface or individual bus centered on the processor 410, rather than a common bus 470. For example, the processor 410 may be connected to at least one of the memory 420, the transceiver apparatus 430, the input interface apparatus 440, the output interface apparatus 450, and the storage apparatus 460 through an exclusive interface.

The processor 410 may run a program command that is stored in at least one of the memory 420 and the storage apparatus 460. The processor 410 may mean a central processing unit (CPU), a graphics processing unit (GPU), or an exclusive processor that performs the methods according to the embodiments of the present disclosure. The memory 420 and the storage apparatus 460 may each be configured of at least one of a volatile storage medium and a non-volatile storage medium. For example, the memory 420 may be configured of at least one of a read only memory (ROM) and a random access memory (RAM).

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

It is apparent to those skilled in the art that the present disclosure may be embodied in other specific forms without departing from essential characteristics of the present disclosure. Accordingly, the aforementioned detailed description should not be construed as restrictive in all terms and should be exemplarily considered. The scope of the present disclosure should be determined by rational construing of the appended claims and all modifications within an equivalent scope of the present disclosure are included in the scope of the present disclosure.

What is claimed is:

1. An adversarial attack method, comprising:
- selecting vulnerable positions of an original source code;
- acquiring open source codes based on an open source code set;
- selecting dissimilar codes among the open source codes based on dissimilarity of the open source codes;
- acquiring an attention score for each of the dissimilar codes;
- extracting a snippet from at least one of the dissimilar codes based on the attention scores;
- generating an adversarial source code based on the at least one snippet, wherein generating the adversarial source code comprises:
  - generating a dead code by inserting the at least one snippet into a character string variable name; and
  - generating the adversarial source code by inserting the dead code into the vulnerable positions of the original source code.

2. The method of claim 1, wherein the selection of the dissimilar codes among the open source codes based on dissimilarity of the open source codes comprises:
- acquiring similarity between the open source codes;
- acquiring a dissimilarity score of each of the open source codes based on the similarity; and
- selecting some of the open source codes as the dissimilar codes based on the dissimilarity score.

3. The method of claim 2, wherein the acquisition of the similarity between the open source codes comprises acquiring cosine similarity between the open source codes.

4. The method of claim 1, wherein the extraction of the snippet from at least one of the dissimilar codes based on the attention scores comprises:
- extracting sentences from each of the dissimilar codes; and
- extracting the sentence extracted from the dissimilar code with a highest attention score among the extracted sentences as the snippet.

5. A non-transitory computer-readable recording medium recording a program for executing the method of claim 1 on a computer.

6. An adversarial source code generation apparatus, comprising:
- a processor; and
- a memory storing one or more instructions executed by the processor,
- wherein the one or more instructions comprises:
  - selecting vulnerable positions of an original source code;
  - acquiring open source codes based on an open source code set;
  - selecting dissimilar codes among the open source codes based on dissimilarity of the open source codes;
  - acquiring an attention score for each of the dissimilar codes;
  - extracting a snippet from at least one of the dissimilar codes based on the attention scores;
- generating an adversarial source code based on the at least one snippet, wherein generating the adversarial source code comprises:
  - generating a dead code by inserting the at least one snippet into a character string variable name; and
  - generating the adversarial source code by inserting the dead code into the vulnerable positions of the original source code.

7. The apparatus of claim 6, wherein the selection of the dissimilar codes among the open source codes based on dissimilarity of the open source codes comprises:
- acquiring similarity between the open source codes;
- acquiring a dissimilarity score of each of the open source codes based on the similarity; and
- selecting some of the open sources as the dissimilar codes based on the dissimilarity score.

8. The apparatus of claim 7, wherein the acquisition of the similarity between the open source codes comprises acquiring cosine similarity between the open source codes.

9. The apparatus of claim 6, wherein the extraction of the snippet from at least one of the dissimilar codes based on the attention scores comprises:
- extracting sentences from each of the dissimilar codes; and
- extracting the sentence extracted from the dissimilar code with the highest attention score among the extracted sentences as the snippet.

10. An adversarial attack performance analysis method, comprising:
- receiving an original source code from an original source code provision apparatus;
- receiving an adversarial source code from an adversarial source code generation apparatus; and
- determining whether an artificial intelligence model has been attacked by the adversarial source code based on the original source code and the adversarial source code,
- wherein the adversarial source code is generated by:
- selecting vulnerable positions of an original source code;
- acquiring open source codes based on an open source code set;
- selecting dissimilar codes among the open source codes based on dissimilarity of the open source codes;
- acquiring an attention score for each of the dissimilar codes;
- extracting a snippet from at least one of the dissimilar codes based on the attention scores;
- generating the adversarial source code based on the at least one snippet, wherein generating the adversarial source code comprises:
  - generating a dead code by inserting the at least one snippet into a character string variable name; and
  - generating the adversarial source code by inserting the dead code into the vulnerable positions of the original source code.

11. The method of claim 10, wherein the selection of the dissimilar codes among the open source codes based on dissimilarity of the open source codes comprises:
- acquiring similarity between the open source codes;

acquiring a dissimilarity score of each of the open source codes based on the similarity; and selecting some of the open sources as the dissimilar codes based on the dissimilarity score.

12. The method of claim 11, wherein the acquisition of the similarity between the open source codes comprises acquiring cosine similarity between the open source codes.

13. The method of claim 10, wherein the extraction of the snippet from at least one of the dissimilar codes based on the attention scores comprises:

extracting sentences from each of the dissimilar codes; and extracting the sentence extracted from the dissimilar code with the highest attention score among the extracted sentences as the snippet.

* * * * *